United States Patent
Tessman

(10) Patent No.: US 9,321,984 B2
(45) Date of Patent: Apr. 26, 2016

(54) METHOD FOR PROCESSING RICE-OIL

(71) Applicant: HT NUTRI Sàrl, Neuchâtel (CH)

(72) Inventor: Walter Szortyka Tessman, Camaquã (BR)

(73) Assignee: HT NUTRI SÁRL, Neuchâtel (CH)

( * ) Notice: Subject to any disclaimer, the term of this patent is extended or adjusted under 35 U.S.C. 154(b) by 0 days.

(21) Appl. No.: 14/382,361

(22) PCT Filed: Feb. 27, 2013

(86) PCT No.: PCT/EP2013/053969
§ 371 (c)(1),
(2) Date: Sep. 2, 2014

(87) PCT Pub. No.: WO2013/127882
PCT Pub. Date: Sep. 6, 2013

(65) Prior Publication Data
US 2015/0038729 A1   Feb. 5, 2015

(30) Foreign Application Priority Data
Mar. 2, 2012   (CH) ........................................ 278/12

(51) Int. Cl.
C11B 3/14 (2006.01)
C11B 3/00 (2006.01)
A23D 9/007 (2006.01)

(52) U.S. Cl.
CPC . *C11B 3/14* (2013.01); *A23D 9/007* (2013.01); *C11B 3/001* (2013.01); *C11B 3/006* (2013.01)

(58) Field of Classification Search
None
See application file for complete search history.

(56) References Cited

U.S. PATENT DOCUMENTS

| 6,054,144 | A | 4/2000 | Burruano et al. |
| 6,448,423 | B1 * | 9/2002 | Hernandez et al. ........... 554/197 |
| 2001/0047101 | A1 | 11/2001 | van Amerongen et al. |
| 2003/0134028 | A1 | 7/2003 | Lievense |

FOREIGN PATENT DOCUMENTS

| BR | PI9608914-8 A | 3/1999 |
| BR | PI9710183-4 A | 8/1999 |
| BR | PI0215991-0 A | 11/2005 |
| WO | 9910456 A1 | 3/1999 |
| WO | 2004055040 A1 | 7/2004 |

OTHER PUBLICATIONS

International Search Report for PCT/EP2013/053969 dated Jun. 18, 2013.
Abstract of JP 6340889, dated Dec. 13, 1994, WPI World Patent Information Derwent, vol. 9, No. 95, XP002020183.
Abstract of IN 183639, Database WPI, dated Mar. 11, 2000, Week 201034, Thomson Scientific, London, GB, AN 2010-F43749, XP002698468.

(Continued)

*Primary Examiner* — Yate K Cutliff
(74) *Attorney, Agent, or Firm* — Pearne & Gordon LLP

(57) ABSTRACT

According to the present invention there is provided a method of processing rice oil comprising the steps of removing one or more phosphorus compounds from the rice oil; heating the rice oil to a temperature of between 200° C.-260° C.; applying a pressure of between 0.1-1 kgf/cm² to the rice oil; extracting a by-product from the rice oil.

15 Claims, 1 Drawing Sheet

(56) References Cited

OTHER PUBLICATIONS

Abstract for BRPI 0401540, dated Nov. 16, 2004, Meyer Wilson Cauduro.

Abstract and translation for BR 9902325, dated Apr. 11, 2000, Johnson & Johndon, Corresponds to U.S. Pat. No. 6,054,144A.

Abstract of IN 183639, dated Mar. 11, 2000, Council of Scientific & Industrial Research.

* cited by examiner

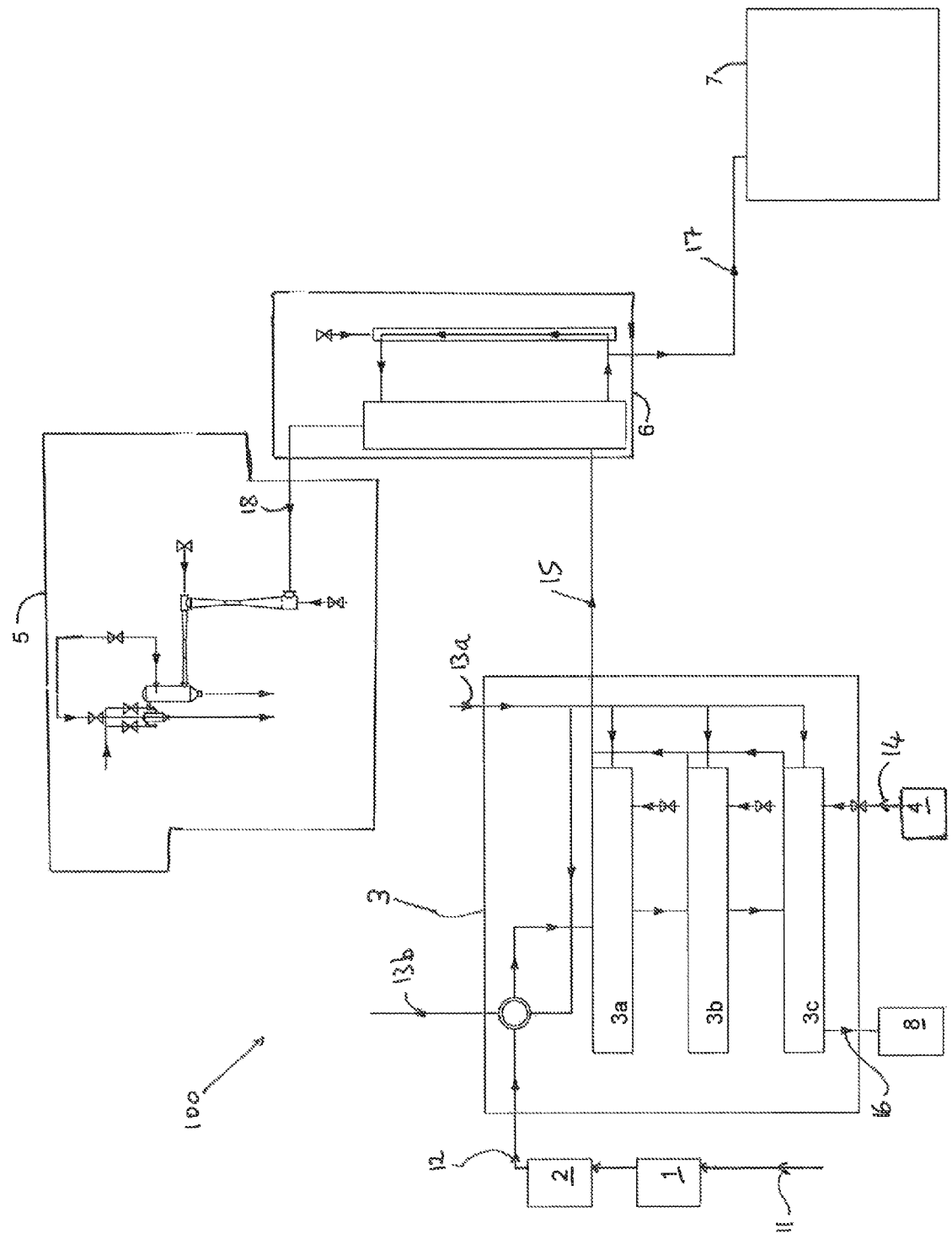

METHOD FOR PROCESSING RICE-OIL

FIELD OF THE INVENTION

The present invention concerns a method for processing rice oil, and in particularly, but not exclusively to a method for processing rice oil to provide rice oil which is rich in unsaponifiable substances.

DESCRIPTION OF RELATED ART

It is known that the raw oil content of unsaponifiable substances is of 4.0 to 5.0% and that just after being refined such content is still higher than 3.0%. The yield of rice bran from a rice milling process is about 8.0% and its oil content is between 14% to 18% depending on the geographical area, the seed varieties and the process used to extract the oil from rice bran. This means that there is about 10 to 12 kg of raw oil per ton of processed rice.

Existing processes for extracting oil from rice bran are complex. Furthermore the refinement of the oil is not an easy procedure because of its high acidity, its high content of unsaponifiable substances, its high content of waxes (3.0%) and its high content of colours, which are often difficult to control.

Rice oil contains a compound know as γ-oryzanol (gamma-oryzanol). γ-oryzanol is classified as an oxidation inhibitor. Its antioxidant action is synergic with the healthy effect of tocopherols and tocotrienols. γ-oryzanol has effects upon growth; can be used to combat cephalic and cervical diseases; can be used to minimize menopause symptoms; can be used to fight anaemia; can be used to treat ulcers caused by stress and to aid in the treatment of circulatory diseases.

The properties of γ-oryzanol allow it to be widely used as a medicine for skin diseases such as psoriasis, in cosmetics as an anti-aging agent and in sun-block formulations. γ-oryzanol has an ergogenic effect when mixed in food for racehorses and horses that take part in other horse riding sports, because it is safe and has no collateral effects, such as those caused by anabolic-steroids. γ-oryzanol is a group of ferulic acid esters of phytosterols and triterpene alcohols.

Studies reached the conclusion that the oil contained in rice bran is responsible for the decrease of LDL cholesterol levels, and that this is due to its composition containing γ-oryzanol and the synergic effect of its components (i.e. the synergic effect of components such as tocopherols, tocotrienols, ferulic acids esters, triterpene alcohols) as long as they are preserved in the oil composition after having been processed. Therefore for the oil to have the ability to decrease of LDL cholesterol levels the processing of the rice bran to extract the oil must maintain the γ-oryzanol within the oil. Chemical processes used to extract the oil from rice bran typically destroys the γ-oryzanol and there oil extracted from rice bran using chemical methods does not have the ability to decrease LDL cholesterol levels.

A search in the state-of-the-art concerning the technical field of the invention showed a series of patent documents that deal with processes to obtain γ-oryzanol.

In patent BRPI 0,215,991, Narayan, A. et al present a simple process for the crystallization of γ-oryzanol from an γ-oryzanol enriched fraction. It refers to a simple and new process using only one container for the preparation of γ-oryzanol from the saponifiable fraction of the saponaceous material of the oil from rice bran (rbo) enriched by γ-oryzanol.

A food complement formula for horses, rich in fat, lysine, fiber and gamma-oryzanol, which supplies the need of energy expended in competitions is revealed in patent BRPI 0,401,540, Meyer, W. The formulation of such food complement for horses has a high content of fat, lysine, fiber and gamma-oryzanol, to viz: 1 to 4% lysine, at least 20% fat, and 0.1 to 1% gamma-oryzanol. A formula preferred as food complement for horses is the following, by volume:—humidity 5 to 12%—raw protein 12 to 25%—ethereal extract 20 to 30%—fiber 5 to 12%—mineral material 5 to 15%—lysine 1 to 4%-gamma-oryzanol 0.1 to 1%. The following elements may electively be added to the food complement for horses:—calcium 1 to 2%—phosphorous 0.5 to 6%. The following other components may be added to the food complement:—zinc 40 to 11,600 mg/Kg—iron 50 to 5,800 mg/Kg—copper 50 to 13,200 mg/Kg—manganese 100 to 2,300 mg/Kg—cobalt 0.1 to 2 mg/Kg—selenium 0.1 to 33 mg/Kg.

Also known is a food product based on fats, yellow fat paste, including an oily concentrate, which is described in patent BRPI 9,608,914, Lievense, L., and has the effect of reducing blood cholesterol in sufficient quantities, as long as the product is used in accordance with consumer needs and habits, since at least one compound of tocotrienol, γ-oryzanol and phytosterol is present and, preferably at least one compound of γ-oryzanol and phytosterol. In a preferred modality, fat in the product corresponds to at least 30%, in weight, preferably at least 45% in weight of pufatriglycerides. A positive contribution to health in general and specifically to the decrease of the blood cholesterol level may be achieved by regularly consuming the new food products based on fat which have just been found.

Patent BRPI 9,710,183, Amerongem, M., et al, which presents a process to obtain a γ-oryzanol concentrate from a fatty substance containing γ-oryzanol, preferably a raw oil, by the following steps: at least one of the steps of the process for removal of the existing phospholipids and removal of free fatty acids, preferably by means of extraction; alkaline neutralization of the obtained product; separation and removal of the oily phase obtained. An additional separation step is preferably also carried out in an acqueous and an oily phase by adding a pH<5 acid, preferably a pH<3 one, and the subsequent removal of any non-fatty substances, such as water, alkaline and acid hydroxid used as from the oily phase.

Patent BRPI 9,902,325, Burruano, B., et al, presents a method to produce sterol formula dispersive in water, in which a method for the preparation of β-sitosterol, γ-oryzanol, esters of these two compounds and related compounds is described, which provides sterol in a ready-to-use form. The method includes drying the β-sitosterol by pulverization in a formulation of mixed mycellia. The product is supplied in a convenient form and can be used together with food or beverage or incorporated in the form of a solid and suspension doses.

Thus, according to the pertinent considerations on the state-of-the-art discussed above, one can realize that there are different processes to obtain γ-oryzanol. However, such processes are complex. Such steps happen to be inefficient for industrial production and the production-product cost ratio is unfavourable.

There is a need in the art for a method of processing rice oil to provide rice oil which has a higher γ-oryzanol content.

BRIEF SUMMARY OF THE INVENTION

According to the present invention there is provided a method of processing rice oil comprising the steps of, removing one or more phosphorous compounds from the rice oil; heating the rice oil to a temperature of between 200° C.-260°

C.; applying a pressure of between 0.1-1 kgf/cm² to the rice oil; extracting a by-product from the rice oil.

Rice oil is oil which has been derived from rice bran.

The rice oil which has been subjected to the process of the present invention is rich in γ-oryzanol because temperature and pressure only is used to refine the rice oil. The processed rice oil is typically used to make equine nutrition supplement and is beneficial to increases muscle mass and protect muscle against oxidant effect provided by high level training The method of processing rice oil of the present invention results in a high quality rice oil which is rich in unsaponifiable substances. Specifically the rice oil will contain high content of tocopherols, tocotrienols and phytosterols and chiefly rich in γ-oryzanol, which is a mix of various compounds, mainly esters of feluric acid with triterpenic sterol or alcohols. Such elements have antioxidant and hipocholesterolemic properties that reduce the level of cholesterol in animals and human beings. The resulting rice oil is an excellent source of vitamins, a highly nutritive product, rich in unsaturated fatty acids and other nutrients of interest in anti-aging and clinical treatment of skin diseases. The resulting rice-oil may thus be used to manufacture rice oil-based functional products for animal and human use e.g. functional food product for consumption.

The processed rice oil comprises a compound called γ-oryzanol. γ-oryzanol is formed from a mix of pheluric acid esters with sterols and triterpene alcohols, all of which are unsaponifiable substances existing in rice oil and in particular rice bran oil. The content of γ-oryzanol in the processed rice oil is of 2.0% in raw oils and 1.7% in degummed oils. For crude rice bran oil the content of γ-oryzanol is 0.5% and the rice oil which has been processed using the method of processing according to the present invention, contains at least 1% γ-oryzanol. So, the processed rice oil, with an unsoponifiable fraction, is a food ingredient, but also a nutraceutical, pharmaceutical and cosmetic ingredient that contains a unique complex of antioxidant components that occur naturally. Nutraceutical products are substances in an intermediate range between food and drugs, between nutrient and drugs, comprising not only traditional nutrients, such as vitamins, mineral salts, amino acids or poliunsaturated fatty acids, but also non-nutrients, such as fibers, besides a wide range of substances which apparently contribute to the prevention or even cure of diseases, such as lycopene in tomatoes, resveratrol in wine, phytosterols in grape peel, which may or not be present in food—and which are often called functional food. In most cases, the action mechanisms are not yet fully known, and such affirmatives are based more on epidemiological data than on biochemical or physiological essays. The rice oil which has been processed using processing according to the present invention can be used in Margarine, nutritional supplements and many other foods.

The amount of fatty acids in the rice oil dictates the temperature at which the rice oil is heated to and the pressure which is applied to the rice oil. Accordingly the method may further comprise the step of determining the amount of free fatty acids which are in the rice oil which is to be processed.

The amount of free fatty acids which are contained in the rice oil can be determined using methods known in the art. The preferable method for determining the amount of free fatty acids in the rice oil is the method disclosed in *AOCS (American Oil Chemistry Society)*-Ca 5A-40 (reapproved version 1977) for determining the content of free fatty acid in the range between 1.0-30%. In this preferable method oil sample bottles 115 ml, 230 ml, or 250 ml as well as an Erlenmeyer flask is used. The reagents use are, 1. Ethyl alcohol, 95%; the alcohol must give a definite distinct and sharp end-point with phenolphthalein and must be neutralized with alkali to a faint but permanent pink colour just before using; 2. Phenolphthalein indicator solution, 1% in 95% alcohol (Isopropanol, 99%, may be used as an alternative solvent); 3. Sodium hydroxide solution accurately standardized. The procedure of the method is as follows: The raw rice oil must be well mixed and entirely liquid before weighing. 7.05±0.05 grams of raw rice oil is taken as a sample. The sample is weighed into an oil sample bottle or Erlenmeyer flask (the bottle of flask is capped and shaken vigorously for one minute if the rice oil has been blanketed with carbon dioxide gas). 75 ml of hot neutralized alcohol and 2 ml of indicator is added to the bottle/flask. Titrate with alkali (the strength of the alkali should be 0.25N) shaking vigorously to the appearance of the first permanent pink colour of the same intensity as that of the neutralized alcohol before addition of the sample. The colour must persist for 30 seconds.

The percentage of free fatty acids is calculated as oleic acid using the formula:

$$\text{Fee fatty acids as oleic, \%} = (\text{Ml. Of alkali} * N * 28.2)/(\text{Weight of sample})$$

wherein N is the strength of the alkali.

The free fatty acids are frequency expressed in terms of acid value instead of % free fatty acids. The acid value is defined as the number of mg of KOH necessary to neutralize 1 g of sample. To convert % free fatty acid (as oleic) to acid value, multiply the former by 1.99.

The steps of heating the rice oil to a temperature of between 200° C.-260° C. and applying a pressure of between 0.1-1 kgf/cm² to the rice oil may comprise; heating the rice oil to a temperature between 200-220° C. and applying a pressure between 0.1-0.3 kgf/cm² to the rice oil, if the amount of free fatty acids in the rice oil which is to be processed is between 1-5% weight; heating the rice oil to a temperature between 221-240° C. and applying a pressure between 0.3-0.5 kgf/cm² to the rice oil, if the amount of free fatty acids in the rice oil which is to be processed is between 5-10% weight; heating the rice oil to a temperature between 241-260° C. and applying a pressure between 0.5-1.0 kgf/cm² to the rice oil, if the amount of free fatty acids in the rice oil which is to be processed is 10% or more weight.

Preferably the rice oil is heated to a temperature of 200° C. and a pressure of 0.1 kgf/cm² is applied to the rice oil, when the rice oil contains between 3-6% weight free fatty acids. Most preferably the rice oil is heated to a temperature of 200° C. and a pressure of 0.1 kgf/cm² is applied to the rice oil, when the rice oil contains 5% weight free fatty acids.

Preferably the steps of heating the rice oil to a temperature of between 200° C.-260° C. and applying a pressure of between 0.1-1 kgf/cm² to the rice oil, are carried out simultaneously.

The step extracting a by-product from the rice oil may be carried out simultaneously to the steps of heating and applying a pressure to the rice oil.

The step removing one or more phosphorous compounds from the rice oil may comprise carrying out a $H_2O$-based homogenization process. The step removing one or more phosphorous compounds from the rice oil may comprise adding water to the rice oil to form a mixture; blending the mixture so that the one or more phosphorous compounds bond with the water, and removing the one or more phosphorous compounds which have bonded with the water. The $H_2O$-based homogenization process may be carried out in a simple mixing tank which contains a paddle stirrer.

The one or more phosphorous compounds which have bonded with the water form a first by-product.

The mixture may be blended until it is homogenous. Typically, the mixture is blended for a period between 30 minutes and 1.5 hours so that the mixture is homogenous. Most preferably the mixture is blended for a period of 1 hour so that the mixture is homogenous. Typically, the mixture is blended using a paddle which rotates at a speed of 50 RPM. Preferably the step of blending is carried out at a temperature of between 40-80° C., and most preferably at a temperature of 60° C.

The step of removing the one or more phosphorous compounds which have bonded with the water may comprise carrying out centrifugation of the blended mixture. Mechanical centrifugation technology with high rotation plates may be used to perform this step.

The method may further comprise the step of heating the blended mixture to a temperature of between 40-80° C. before carrying out the centrifugation. Preferably the blended mixture is maintained at a temperature of between 40-80° C. during the centrifugation.

Preferably the blended mixture is heated to a temperature of 60° C. before carrying out the centrifugation. Preferably the blended mixture is maintained at a temperature of 60° C. during the centrifugation.

The blended mixture may be heated by indirect heating by a steam jacket or coil. Preferably the blended mixture is heated using indirect steam in a jacketed tank.

Once the blended mixture has undergone centrifugation the phosphorous compounds which have bonded with the water will sediment, and degummed rice oil may be decanted.

The degummed rice oil may then be heated to a temperature of between 200° C.-260° C. Preferably the degummed rice oil is heated to a temperature of between 215° C.-220° C. Typically heating the degummed rice oil to a temperature of between 215° C.-220° C. is performed in a heat exchanger and thermal oil in the heat exchanger is used to heat the degummed rice oil.

A pressure of between 0.1-1 kgf/cm$^2$ may be applied to the degummed rice oil by means of adding steam to the heat exchanger in which the degummed rice oil is heated. The steam will increase the pressure within the heat exchanger to between 0.1-1 kgf/cm$^2$. The pressure within the heat exchanger corresponds to the pressure which is applied to the degummed rice oil within the heat exchanger. Preferably, a pressure of 0.2 kgf/cm$^2$ is be applied to the degummed rice oil. The steam may be provided by a boiler.

Preferably the degummed rice oil is simultaneously, heated to a temperature between 200° C.-260° C. and a pressure of between 0.1-1 kgf/cm$^2$ is applied to the degummed rice oil. Most preferably the degummed rice oil is simultaneously, heated to between 215° C.-220° C., and a pressure of 0.2 kgf/cm$^2$ is applied to the degummed rice oil. When the degummed rice oil is simultaneously, heated to these temperatures, and subjected to these pressures, a second by-product is formed in the degummed rice oil. The second by-product may be free fatty acids. The free fatty acids will evaporate out of the degummed rice oil. The free fatty acids which have evaporated out of the degummed rice oil may form a free fatty acid vapour inside the heat exchanger.

The method may comprise the step of extracting the second by-product. Preferably the method comprises the step of extracting the free fatty acid vapour from inside the heat exchanger using a vacuum. Accordingly the method may comprise the step of applying a vacuum to a chamber of the heat exchanger in which the degummed rice oil has been or is being heated and pressure has or is being applied.

A vacuum may be a negative pressure of between 700 to 760 mmHg. Preferably, the vacuum is a negative pressure of 755 mm Hg.

BRIEF DESCRIPTION OF THE DRAWINGS

The invention will be better understood with the aid of the description of an embodiment given by way of example and illustrated by the figures, in which:

FIG. 1 illustrates a process plant which can execute the method of processing rice-oil according to an embodiment of the present invention.

DETAILED DESCRIPTION OF POSSIBLE EMBODIMENTS OF THE INVENTION

FIG. 1 illustrates a process plant 100 which can execute the method of processing rice-oil according to an embodiment of the present invention. Typically raw rice-oil 11 is used as a raw material and therefore defines the input to the process plant 100 illustrated in FIG. 1.

The method of processing rice-oil according to the present invention involves two stages. In the first stage the rice oil is degummed, being submitted to a H$_2$O-based homogenization process.

Homogenization is the intensive blending of mutually related substances or groups of mutually related substances to form a constant of different insoluble phases (sometimes with the addition of surfactants) to obtain a suspension or emulsion of phosphorous compounds, such as phospholipids and phosphatides (the gumms), which have bound with water. In this example the H$_2$O-based homogenization process is a process whereby water is blended with the rice oil in a mixer 1. When the water is blended with the rice oil an emulsion is provided; gumms within the rice oil bond to the water thereby "degumming" the rice oil (degumming is the process of removing of gums from the rice oil). Gums are phosphorous compounds; the phosphorous compounds may include lecithin's and/or phospholipids. The phosphorous compounds (or 'gums') are amphoteric and thus form a phase or micelle.

The gums which have bonded to the water form a first by-product. This first by-product (phosphorous compounds (or 'gums')) is removed from the blended water-rice-oil mixture, by centrifugation in a centrifuge machine 2. The conditions for centrifugation are as follows: the blended water-rice-oil mixture is provided in holders of the centrifuge machine 2; the holders are then rotated at a speed of 7100 RPM; during centrifugation the blended water-rice-oil mixture is maintained at an average temperature of 60° C.

During the step of centrifugation the centrifugal force generated by the rotation of the holder causes the first by-products (gums) to migrate away from the axis of centrifuge, causing the first by-products (gums) to sediment at the end of the holder and leaving the degummed rice oil above, thus separating the first by-product from the rice oil. Degummed rice oil is decanted from the holders after centrifugation has been completed.

In the second stage of processing the degummed rice-oil 12 is passed to heat exchanger 3 wherein it is simultaneously subjected to a temperature of between 200° C. and 260° C. and to a pressure of between 0.1-1 kgf/cm$^2$ (it should be noted that 0.1 kgf/cm$^2$ is equal to 9.8 Pa, therefore any pressure given in kgf/cm$^2$ may be easily converted to Pascal's; for example 0.2 kgf/cm$^2$ is 19.6 kPa and 1 kgf/cm$^2$ is 98 kPa etc.) The degummed rice-oil is heated and pressurised in the heat exchanger 3 which comprises three distillers 3a,b,c. Under these conditions a second by-product, in the form of free fatty acids, is formed in the rice-oil.

The temperature to which the degummed rice oil is heated depends on the amount of free fatty acids which are in the rice oil. Therefore before the raw rice oil is applied to the mixer 1 a sample is taken from the raw rice oil and the amount of free fatty acids in the sample of raw rice oil is determined using the method outlined in the *AOCS* (*American Oil Chemistry Society*)-Ca 5A-40 (reapproved version 1977) for determining the contents of free fatty acid range between 1.0-30%.

The relationship between the amount of free fatty acids which are in the rice oil and the temperature to which the degummed rice oil is to be heated is and the pressure which should be applied to the degummed rice oil is as follows: If it has been determined from the sample that the raw rice oil contains free fatty acid content between 1-5% weight then the appropriate temperature to which the degummed rice oil should be heated is between 200-220° C. and the appropriate pressure to apply to the degummed rice oils is between 0.1-0.3 kgf/cm$^2$. If it has been determined from the sample that the raw rice oil contains free fatty acid content between 5-10% weight then the appropriate temperature to which the degummed rice oil should be heated is between 221-240° C. and the appropriate pressure to apply to the degummed rice oils is between 0.3-0.5 kgf/cm$^2$ If it has been determined from the sample that the raw rice oil contains free fatty acid content of 10% or more weight then the appropriate temperature to which the degummed rice oil should be heated is between 241-260° C. and the appropriate pressure to apply to the degummed rice oils is between 0.5-1.0 kgf/cm$^2$.

Since the amount of free fatty acids which are in the rice oil is known from the sample, the appropriate temperature between 200° C. and 260° C. to which the degummed rice oil should be heated, and pressure between 0.1-1 kgf/cm$^2$ which should be applied to the rice oil, can be determined. For example if it is determined from the sample that the raw rice oil contains 5% free fatty acid then it can be determined, using the relationship between free fatty acid and temperature, that the degummed rice oil should be heated to a temperature of 200° C. and a pressure of 0.1 kgf/cm$^2$ should be applied to the degummed rice oil. If for example it is determined from the sample that the raw rice oil contains 15% free fatty acid then it can be determined, using the relationship between free fatty acid and temperature, that the degummed rice oil should be heated to a temperature of 260° C. a pressure of 1 kgf/cm$^2$ should be applied to the degummed rice oil.

Once the content of free fatty acids in the degummed rice oil has been determined, the appropriate temperature between 200° C. and 260° C. to which the rice oil should be heated and the appropriate pressure between 0.1-1 kgf/cm$^2$ to apply to the rice oil, in the heat exchanger 3, can be determined. Hot thermal oil 13*a* is input to the heat exchanger 3 to heat the degummed rice oil 12 which has been fed into the heat exchanger 3 from the centrifuge machine 2, to the appropriate temperature between 200° C. and 260° C. It will be understood that the temperature of the thermal oil 13 will be such that it heats the degummed rice oil to the appropriate temperature between 200° C. and 260° C. Thermal oil 13*b* which is output from the heat exchanger 3 has transferred its heat to the degummed rice oil 12 in the heat exchanger 3 and therefore is cooler than the hot thermal oil 13*a* which was input to the heat exchanger 3.

A boiler 4 inputs steam 14 to the heat exchanger 3; the steam 14 is used to increase the pressure within the heat exchanger 3 so that the degummed rice oil 12 in the heat exchanger 3 is subjected to the appropriate pressure. The amount of steam 14 added depends on the pressure which is to be applied to the degummed rice oil 12. Steam 14 is added from the boiler 4 to the heat exchanger 3 until the appropriate pressure, between 0.1-1 kgf/cm$^2$ is achieved within the heat exchanger 3. To increase the pressure applied to the degummed rice oil 12 more steam is added from the boiler 4 to the heat exchanger 3 to increase the pressure within the heat exchanger 3; to reduce the pressure which is applied to the rice oil steam 14 is extracted from the heat exchanger 3.

When the degummed rice oil 12 is heated to a temperature between 200° C. and 260° C. and is simultaneously subjected to a pressure of between 0.1-1 kgf/cm$^2$, free fatty acids in the degummed rice oil 12 evaporate out of the degummed rice oil 12, thus leaving a rice oil which has a reduced free fatty acid content. The free fatty acids which evaporate out of the degummed rice oil in the heat exchanger 3 define a second by-product.

The evaporated free fatty acids form a vapour within the heat exchanger 3. A vacuum system 5 is used to suck the free fatty acid vapour 15 out of the heat exchanger 3 and into a condenser 6. Usually the vacuum 18 provided is 755 mm Hg. Preferably, the vacuum system 5 is used to suck the free fatty acid vapour 15 out of the heat exchanger 3 at the same time at the rice oil is heated to a temperature between 200° C. and 260° C. and subjected to a pressure of between 0.1-1 kgf/cm$^2$. Alternatively the vacuum system 5 is used to suck the free fatty acid vapour 15 out of the heat exchanger 3 after the rice oil has been heated to a temperature between 200° C. and 260° C. and subjected to a pressure of between 0.1-1 kgf/cm$^2$.

The condenser 6 is used to cool the free fatty acid vapour so that it condenses to form a free fatty acid liquid 17. The free fatty acid liquid 17 is dispensed into a collecting vat 7.

Once the free fatty acids (i.e. the second by-product) have been removed from the degummed rice-oil the rice oil remaining in the heat exchanger defines the processed rice oil 16. The processed rice oil is removed from the heat exchanger into a storage container 8, where it is stored for future use.

The processed rice oil 16 is rich in unsaponifiable substances. In particular the processed rice oil 16 comprises a high content of tocoferols, tocotrienols and phytosterols, and is especially rich in γ-oryzanol, and has a maximum acidity of 0.90% per weight of free fatty acids (e.g. oleic acid).

The processed rice-oil may be used to make functional foods for animals and humans such as food supplements for equines, felines, canines and for humans the rice bran oil may be used as topping for salads, cooking oil, as spreads and margarines. For example the rice oil, with its high γ-oryzanol, can be used as a lipid ingredient in the processing of margarine. The rice oil can be added directly to animal food as a food supplement or may be used as an ingredient as a component of meal formulation.

The invention claimed is:

1. A method of processing rice oil comprising the steps of:
    removing one or more phosphorous compounds from the rice oil;
    heating the rice oil to a temperature of between 200° C.-260° C.;
    applying a pressure of between 0.1-1 kgf/cm$^2$ to the rice oil; and
    extracting a by-product from the rice oil,
    wherein the processed rice oil contains at least 1% γ-oryzanol and has a maximum acidity of 0.90% per weight of free fatty acids.

2. The method according to claim 1,
    wherein the steps of heating the rice oil to a temperature of between 200° C.-260° C. and applying a pressure of between 0.1-1 kgf/cm$^2$ to the rice oil, are carried out simultaneously.

3. The method according to claim 2,
    wherein the step of extracting the by-product from the rice oil is carried out simultaneously to the steps of heating and applying pressure to the rice oil.

4. The method according to claim 1,
further comprising the step of determining the amount of the free fatty acids which are in the rice oil which is to be processed, and wherein the steps of heating the rice oil to a temperature of between 200° C.-260° C. and applying a pressure of between 0.1-1 kgf/cm² to the rice oil comprise:
heating the rice oil to a temperature between 200-220° C. and applying a pressure between 0.1-0.3 kgf/cm² to the rice oil, if the amount of the free fatty acids in the rice oil which is to be processed is between 1-5% weight;
heating the rice oil to a temperature between 221-240° C. and applying a pressure between 0.3-0.5 kgf/cm² to the rice oil, if the amount of the free fatty acids in the rice oil which is to be processed is between 5-10% weight; and
heating the rice oil to a temperature between 241-260° C. and applying a pressure between 0.5-1.0 kgf/cm² to the rice oil, if the amount of the free fatty acids in the rice oil which is to be processed is 10% or more weight.

5. The method according to claim 1, wherein the by-product is the free fatty acids which are evaporated from the rice oil when the rice oil is heated to a temperature of between 200° C.-260° C. and a pressure of between 0.1-1 kgf/cm² is applied to the rice oil.

6. The method according to claim 5, wherein the step of extracting the by-product further comprises the step of using a vacuum to remove the evaporated free fatty acids from a heat exchanger in which the rice oil is as heated to the temperature of between 200° C.-260° C. and a pressure of between 0.1-1 kgf/cm² is applied to the rice oil.

7. The method according to claim 6, wherein the method further comprises the step of condensing the evaporated free fatty acids after they have been removed from the heat exchanger, to form a free fatty acid liquid.

8. The method according to claim 1, wherein the step removing one or more phosphorous compounds from the rice oil comprises:
adding water to the rice oil to form a mixture;
blending the mixture so that the one or more phosphorous compounds bond with the water; and
removing the one or more phosphorous compounds which have bonded with the water.

9. The method according to claim 8,
wherein the mixture is blended until it is homogenous.

10. The method according to claim 8, wherein the step of removing the one or more phosphorous compounds which have bonded with the water comprises carrying out centrifugation of the blended mixture.

11. The method according claim 10,
wherein the method further comprises the step of decanting the rice oil after centrifugation.

12. The method according to claim 10, further comprising the step of heating the blended mixture to a temperature between 40-80° C. before carrying out the centrifugation.

13. The method according to claim 12, wherein the blended mixture is maintained at a temperature of between 40-80° C. while the centrifugation is carried out.

14. The method according to claim 1, wherein the rice oil is heated to a temperature of between 215° C.-220° C.

15. The method according to claim 1, wherein a pressure of between 0.1-0.3 kgf/cm² is applied to the rice oil.

* * * * *